United States Patent Office 3,546,083
Patented Dec. 8, 1970

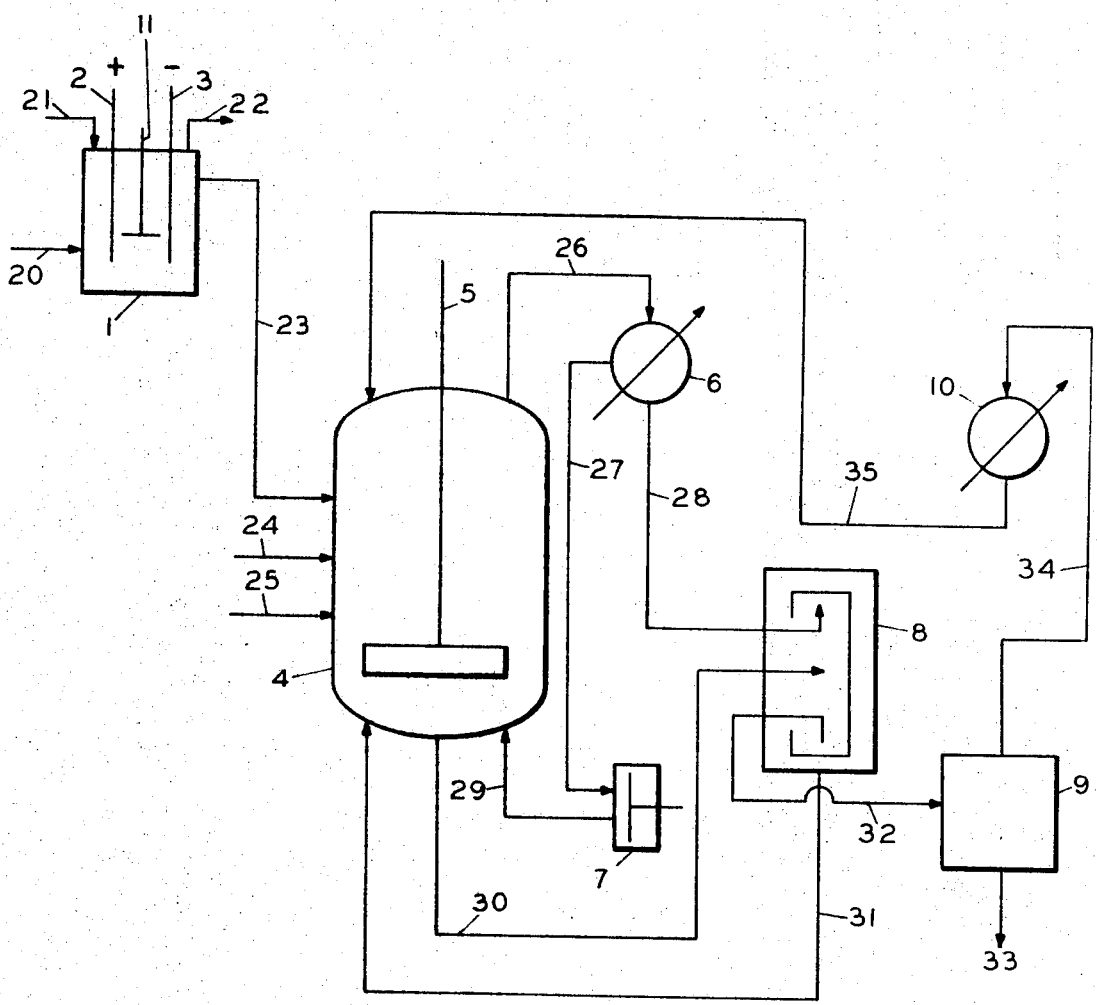

3,546,083
POLYMERIZATION OF OLEFINIC COMPOUNDS
AND CATALYSTS THEREFOR
Morris R. Ort, Kirkwood, Edward H. Mottus, Ballwin, Manuel M. Baizer, St. Louis, and Don E. Carter, Creve Coeur, Mo., assignors to Monsanto Company, St. Louis, Mo., a corporation of Delaware
Filed Mar. 6, 1967, Ser. No. 621,035
Int. Cl. B01k 3/06
U.S. Cl. 204—131                    14 Claims

ABSTRACT OF THE DISCLOSURE

An electrolytic method is described for making olefin, e.g., ethylene, polymerization catalysts. These catalysts are made electrolytically from anodes of transition metals such as vanadium or manganese and metals such as aluminum or alloys of aluminum and vanadium or manganese, a methylene dihalide especially methylene dichloride and an electrolyte such as $HOAlCl_2$. Also, the transition meal, e.g., V or Mn, catalyst component can be made separately as can the non-transition metal, e.g., Al component. Preferably, a small amount of an olefin substantially inert toward polymerization, i.e., a non-reactive olefin such as cyclohexene, is used during the electrolysis to promote conductivity. Also, preferably all materials are substantially pure and are dry during electrolysis and polymerization, except for small known amounts of water which may be added to promote conductivity in electrolysis and/or the polymerization. It is also preferred to blanket the electrolysis cell with an inert gas, such as nitrogen, to exclude oxygen which may tend to poison some of the catalysts. The catalysts are normally soluble in the methylene dihalide medium in which they are made at least in sufficient concentration to be useful as polymerization catalysts.

---

The invention relates to the polymerization of olefinic compounds, polymerization catalysts and an electrolytic method for making the catalysts or one of the catalyst components.

In a copending application Ser. No. 621,036 of even date is described an electrolytic method for making separately the non-transition metal component of the catalysts of the present application. Also described in this copending application are polymerization catalysts including a transition metal compound and a catalytic method for polymerizing olefinic compounds. The catalysts of the present invention are broadly covered by the claims of the copending application. An especial advantage of the catalysts of the present invention is that no complexer is needed since the co-catalysts are prepared together.

In the electrolytic process of the present invention, anodes of transition metals and non-transition metals are used. A single anode which is an alloy of a non-transition metal and a transition metal can be used or separate anodes of transition metals and non-transition metals can be used. Only an anode of a transition metal is used, if it is desired to make the transition metal catalyst component separately. The cathodes can be any conventional electrode material such as graphite or a metal since the cathodes are not consumed in the reaction as are the anodes.

In addition to the anodes, a methylene dihalide is a reactant in the electrolysis to form the catalysts. It is also possible that a gem dihalide such as described in the previously mentioned copending application which does not readily dehydrohalogenate or alkylate can be used instead of the methylene dihalide. The preferred methylene dihalides are methylene dichloride or methylene diiodide, however, methylene dibromide, methylene difluoride, mixtures of the methylene dihalides or mixed methylene dihalides such as $CH_2ClI$ can be used. The methylene dihalide can be used in excess of that required for the electrolysis as an electrolysis cell medium or an inert solvent such as hexane, benzene or the like can be used.

Electrolytes can be the same as in the previously mentioned copending application, i.e., any electrolyte that does not destroy or deactivate the catalyst can be used. The electrolyte that is preferred is $X_2MOR^3$, wherein X is a halogen atom, M is boron or a Group II–A, Group III–A or Group IV–A metal, and $R^3$ is H, alkyl, aryl or other organic group, hydrocarbyl being preferred and especially organic groups having not more than 8 carbon atoms preferred. The most preferred electrolytes are $HOAlCl_2$ or $AlCl_3$, or analogous boron, transition metal or nontransition metal compounds other than aluminum, e.g., $HOBF_2$, $ZnCl_2$, $HOZnCl$, $MnCl_2$ and the like. In fact, most any metal salt will be operable as an electrolyte in the process of the invention, the more soluble salts being preferred.

Preferably, all materials are substantially pure and dry during electrolysis and polymerization, except for small known amounts of water which may be added to promote conductivity in electrolysis and/or the polymerization. Optimum amounts of water to promote conductivity may vary from about 0.1 to 1 mole of water per mole of electrolyte, although more or less water can be used and no water at all is necessary.

In the electrolysis, it is preferred to blanket the electrolysis cell with an inert gas such as nitrogen, argon, helium or the like to avoid poisoning of the catalysts by water vapor or oxygen; however, some catalysts will be more sensitive than others and inert gas blanketing may not always be necessary or desirable.

Also, it is preferred to carry out the electrolysis in the presence of a small amount sufficient to promote conductivity of a non-reactive, i.e., difficult to polymerize, olefin such as 2-butene or cyclohexene. Where the transition metal compound is being made separately. ethylene blanketing or the like can be used as in the above-mentioned copending application since the complete catalyst is not present and the ethylene will not be polymerized.

Transition metals suitable for use in the invention are Group III–B, IV–B, V–B, VI–B, VII–B, VIII and I–B metals, i.e., Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es; Fm, Md, No, Lw, Ti, Zr, Hf, V, Nb, Ta, Cr, Mo, W, Mn, Tc. Re, Fe, Ru, Os, Co, Rh, Ir, Ni, Pd, Pt, Ca, Ag and Au.

Non-transition metals for use in the invention are metals of Groups II, III–A and boron, and IV–A, i.e., Be, Mg, Ca, Sr, Ba, Ra, Zn, Cd, Hg, B, Al, Ga, In, Tl, Si, Ge, Sn and Pb.

In general, the electroylsis is carried out in a similar manner and under similar conditions as the electrolysis of the above-mentioned copending application. Voltage and current usage in the cell will, of course, depend on the construction of the cell, the number of electrodes or electrode surface, the electrolyte and solvent combination, with the voltage being set to make the compounds at as fast a rate as is practical and economical. In the copending application it is indicated that in the making of the non-transition element catalyst component separately electrolytically that there is an undesirable competing chemical reaction and that by using a sufficiently high current density i.e., a current density of 0.366 amp/$dm^2$ or greater substantial amounts of the strictly chemical reaction product are avoided. It is possible that flow rate through the cell may also be a factor. Also, voltage is a function of distances between anode and cathode, so cell geometry will affect the absolute level of required voltage. The electricity supplied to the cell may be either DC or AC. AC may have particular advantage where both electrodes are of the same M. The alternating current can have any desired frequency. The frequency, however, should be sufficiently slow so that the electrochemically generated species can migrate from the electrodes before the polarity is changed.

The electrolysis may be carried out batchwise or as a continuous operation, the continuous operation being of particular advantage when the catalyst prepared electrolytically is used in a continuous polymerization reactor.

The electrolysis may be carried out under pressure or vacuum with appropriate cell modifications; however, atmospheric pressure operation is quite suitable. The preferred temperature is 25–40° C., however, temperatures 0 to 100° C. or even higher or lower can be used. In the process of the present invention, it is desirable to use a sufficiently high voltage to give a current density high enough to avoid producing substantial amounts of the strictly chemical reaction products.

The molar ratio of non-transition metal to transition metal may vary from 0.1:1 to 10:1 on up to 1000:1 or higher, with preferred ratios being 0.3:1 to 200:1. The preferred ratio in each case will depend on the particular metals involved and the ability of the particular catalyst involving these metals to polymerize olefinic compound. For example, in catalysts made from Al/V alloys, the amount of V in the alloy may be of the order of 2.5% or less since these are extremely active polymerization catalysts; whereas, with catalysts made from Al/Ti alloys, usually it is preferred to have the percent Ti in the alloy well above 5%. The desired ratio of the transition metal to the non-transition metal element in the catalyst is proportional to the ratio of elements in the alloy composition and can be obtained by choosing an alloy anode of proper composition, or when using separate transition metal and non-transition element anodes is proportional to the ratio of the areas exposed to electrolysis on the anodes and can be obtained by choosing the proper area ratio. These alloy compositions or area ratios can be calculated by one skilled in the electrolysis art or can easily be determined experimentally in the laboratory. In addition to the alloys used in the experimental examples of the present invention, a number of other alloys of transition and non-transition metals suitable for use as anodes in the present invention are exemplified in the following patents: U.S. 2,905,646, British 832,929, British 836,642, British 854,385, British 886,182 and Japanese 5,989 (1960).

As in the case of the catalysts of the above-mentioned copending application a third component to modify or promote polymerization catalyst activity can be used with the catalysts of the present invention, i.e. water or other electron donor compound. Optimum amounts of water are in the range of about 0.1 to 1.5 moles of water per mole of non-transition compound in the catalyst, although more or less water can be used.

In general, the catalysts of this invention can be used to polymerize the same olefinic compounds and under similar conditions of solvents, temperature, pressure, time, amounts of catalysts and the like as the catalysts of the above-mentioned copending application, and the polymer product can be recovered in similar manner as the copending application.

The catalysts of this invention are capable of polymerizing olefinic compounds and particularly α-olefinically unsaturated compounds either non-polar or polar olefinic compounds. Normally the monomers which we polymerize with our catalysts have not more than 20 carbon atoms since this includes most commercially important monomers; however, our catalysts will polymerize monomers having more than 20 carbon atoms. Our catalysts will produce solid, semi-solid or liquid polymers including oligomers depending on reaction conditions and/or the presence of catalyst modifiers, chain-breaking agents and the like. The preferred solid polymers which can be made with our catalysts have molecular weights of at least 2,000 and preferably at least 10,000; however, polymers having much higher molecular weights ranging from 20,000 to 50,000 or 100,000 and even in many cases as high as 1,000,000 to 3,000,000 or more can be made as desired. The molecular weights are those calculated in the conventional manner on the basis of the viscosity of the polymers in solution as described in the Journal fur Praktische Chemie, 2nd series, vol. 158, 136 (1941), and J.A.C.S. 73, 1901 (1951). These solid polymers generally have high density and similar uses in the plastics industry as the well known Ziegler polymers. The semi-solid or liquid polymers are useful in adhesives, as lube oil additives, gasoline additives, and the like and in general for the same uses as are similar polymers made by conventional means.

At the present time, ethylene is by far the preferred monomer for preparing polymers. The ethylene can be homopolymerized or can be copolymerized with varying amounts particularly of the order of 2 to 50% of higher olefins such as propylene or butylene, especially the former; however, copolymers containing less than 50% ethylene can be also be made. Our catalysts are especially useful for preparing the currently popular ethylene/propylene copolymer rubbers. The ethylene can also be copolymerized with butadiene and/or isoprene. Also of interest are the copolymers of butadiene and/or isoprene with styrene. Homopolymers of butadiene, especially butadiene-1,3, homopolymers of isoprene and copolymers of butadiene with isoprene can also be prepared with the catalysts of our invention. With proper adjustment of catalyst ratios either predominantly, e.g., 85% or higher, cis- or trans-polybutadiene can be made using our catalyst. Other ethylenically unsaturated hydrocarbons can also be polymerized with our catalysts and are of interest and these are propylene, butylenes, especially butene-1, isobutylene, amylenes, 1-octene, 1-dodecene, 1-heptadecene, 1-eicosene and the like. Substituted olefins can also be polymerized by our catalysts such as vinyl cyclohexene, styrene, α-methyl styrene, vinyl naphthalene, vinyl aromatic hydrocarbons generally, etc. Our catalysts are especially desirable for polymerizing styrene to high molecular weight polymers. Polyvinyl ethers can be made with our catalysts, especially homopolymers of alkyl vinyl ethers for example, ethyl vinyl ether, vinyl isobutyl ether, 2-ethylhexyl vinyl ether, etc., and copolymers of the same with ethylene and other copolymerizable ethylenically unsaturated comonomers can also be prepared. Our catalysts are especially useful for polymerizing α-olefinic compounds. A variety of polymers of the various monomers named above with each other and with other comonomers can be prepared with the catalysts of our invention and the present invention in its broadest scope includes the use of our catalysts to prepare polymers or copolymers of any olefinic compounds and even of acetylenic compounds, e.g., acetylene.

An illustrative list of other monomers which can be polymerized by our catalysts is as follows: methacrylic acid and methacrylates such as methyl methacrylate, n-butyl methacrylate, t-butyl methacrylate, 2-ethylhexyl methacrylate, lauryl methacrylate, chloroethyl methacrylate, methoxymethyl methacrylate and the like; nitrogen-containing compounds such as acrylonitrile, N-vinyl-2-pyrrolidone, dimethylaminoethyl methacrylate, vinyl pyridine, 5-methyl-2-vinyl pyridine and the like; acrylic acid and acrylates analogous to the methacrylates named above; other vinyl and vinylidene monomers such as vinyl chloride, vinyl fluoride, vinylidene chloride, vinylidene fluoride, 1-fluoro-1-chloroethylene, acrylonitrile and methacrylonitrile, vinyl acetate, vinyl propionate, vinyloxyethanol, vinyl trimethyl acetate, vinyl hexanoate, vinyl laurate, vinyl chloroacetate, vinyl stearate, methyl vinyl ketone; polyfluoro ethylene of the formula $CF_2=CXY$ where X is H, Cl or F and Y is Cl or F either alone or copolymerized with ethylene or other monomers, including tetrafluoroethylene, chlorotrifluoroethylene, trifluoroethylene, 1,1-dichloro-2,2-difluoroethylene and the like; especially monomer combinations such as the following for making copolymers, ethylene/vinyl chloride, ethylene/indene, ethylene/isobutyl vinyl ether, ethylene/isoprene, ethylene/3 - chloro-1-butene, ethylene/acenaphthylene, ethylene/cyclooctadiene-1,3 or -1,5, ethylene/vinyloxyethanol, ethylene/vinyl acetate, ethylene/cis-cyclooctene, ethylene/dicyclopentadiene, ethylene/2 - ethylhexyl acrylate, ethylene/tetrafluoroethylene, ethylene/3 - methylbutene-1, ethylene/methyl methacrylate, ethylene/4-methylpentene-1, ethylene/1,3-pentadiene, ethylene/-1,7-octadiene, ethylene/phenylacetylene, ethylene/vinylidene chloride, acrylonitrile/isobutylene, acrylonitrile/vinyl acetate, isobutylene/vinylidene chloride, isobutylene/vinyl acetate, vinyl acetate/vinyl methyl ether, lauryl methacrylate/vinyloxyethanol, lauryl methacrylate/styrene, ethylene/propylene/1,4-hexadiene, vinyl chloride/vinyl acetate, styrene/maleic anhydride and the like; other monomers having a plurality of ethylenic bonds, especially conjugated double bonds, such as 2-chlorobutadiene, 2 - fluorobutadiene, 2 - phenoxybutadiene, methacrylic anhydride, ethylene glycol dimethacrylate, diethylene glycol dimethacrylate, triethylene glycol dimethacrylate, tetraethylene glycol dimethacrylate, diethylene glycol diacrylate, decamethylene glycol diacrylate, glyceroltriacrylate, dimethacrylate esters of polyethylene glycols, diallyl maleate, vinyl methacrylate, allyl methacryate, crotyl methacrylate, methalyl methacrylate, diallyl phthalate, diallyl carbonate, diallyl adipate, diallyl fumarate, divinyl succinate, divinyl adipate, divinyl benzene and the like; other monomers such as fumaric and maleic acids and derivatives such as maleic anhydride, mono- and dialkyl esters of fumaric and maleic acids such as ethyl hydrogen fumarate, diethyl and dimethyl fumarate and maleate copolymerized with ethylene, vinyl chloride, styrene, methacrylates, acrylates and the like; ethylene, propylene, isobutylene, 2-ethylhexene-1 and mixed isobutylene/vinyl isobutyl ether copolymerized with maleic anhydride; copolymer of isobutylene with vinyl acetate, dimethyl fumarate and dimethyl maleate; copolymers of allyl chloride with maleic anhydride; copolymers of styrene and condensation product of maleic anhydride and ethylene glycol; copolymers of styrene with the condensation product of maleic anhydride and propylene oxide; and, copolymers of carbon monoxide, sulfur dioxide and acetylene with ethylene.

Normally, catalysts of the invention will be used for polymerization dissolved or suspended in inert organic liquids such as the liquids in which the catalysts were prepared or in the presence of other added solvent. Such solvents for polymerization can suitably be saturated aliphatic and alicyclic, aromatic hydrocarbons and halogenated hydrocarbons. By way of example can be mentioned liquefied propane, iso-butane, normal butane, n-hexane, the various isomeric hexanes, n-heptane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, any of the xylenes, cumene, Decalin, ethylene dichloride, chlorobenzene, carbon tetrachloride, chloroform, dischloromethane and o-dichlorobenzene. In some instances, it is also advantageous to prepare the catalyst in the presence of a monomer, or even the monomer to be polymerized.

Polymerization can readily be effected in the presence of any of the classes of solvents and specific solvents just named, or mixtures thereof. If the proportion of such solvents is kept low in the reaction mixture, such as from 0 to 0.5 part by weight inert organic solvent (i.e., inert to the reactants and catalysts under the conditions employed) per one part by weight of total polymer produced, solvent recovery steps are obviated or minimized with consequent advantage. It is often helpful in obtaining efficient contact between monomers and catalysts in aiding removal of heat of reaction to employ larger amounts of solvent, for example, from 5 to 30 parts or more by weight of solvent per one part by weight of total polymer produced. These inert solvents, which are solvents for the monomers, some or all of the catalyst components and some of the polymers, but are non-solvent for many of the polymers, for example polyethlene, can also properly be termed inert liquid diluents or inert organic liquids.

The amount of catalyst required is dependent on the other variables of the particular polymerization reaction and/or monomer being polymerized and although amounts as small as 0.00005 or less weight percent based on total weight of monomers charged are sometimes permissible, it is usually desirable to use somewhat larger amounts, such as from 0.0001 up to 2 to 5% or considerably higher, say up to 20%, depending on the monomer or monomers being polymerized, the particular catalyst components, the presence or absence of solvent, the temperature, pressure and other reaction conditions. When polymerization is effected in the presence of a solvent a catalyst to solvent volume ratio may vary widely at from about $10^{-3}$ grams per liter to 5 grams per liter. By using as small an amount of catalyst as is economically feasible, problems of removing catalyst from polymer product are minimized or obviated.

The polymerization can be effected over a wide range of temperatures, again the particular preferred temperature being chosen in accordance with the monomer, pressure, particular catalyst and other reaction variables. For many monomers, from room temperature down to say —40° C. or even lower, are suitable and in many cases it is preferred that the temperature be maintained at below about 35° C. However, for other monomers, particularly ethylene, higher temperatures appear to be optimum, say from 50 to 90° C. Temperatures ranging up to 100° C. and higher are generally satisfactory for polymerization with our catalyst.

The pressure at which the polymerization is carried out is dependent upon the chosen monomer, or monomers, as well as other variables. In most instances the polymerization is suitably carried out at atmospheric pressure or higher. Although sub-atmospheric pressures are permissible there would seldom be any advantage. Pressures ranging from atmospheric to several hundred or even many thousand pounds per square inch gauge, e.g., 5,000 p.s.i.g. and higher are suitable. Actually, for the pressure polymerizations, pressures from 2 to 10 atmospheres are sufficient and preferable in polymerizing ethylene. While high pressures are not required in order to obtain the reaction, they will have a desirable effect on the reaction and, in some instances, on polymer quality. A choice of whether or not to use an appreciably elevated pressure will be one of economic and practical consideration, taking into account the advantages that can be obtained thereby.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, if necessary. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which can be contacted externally with suitable cooling medium to maintain the desired reaction temperature.

The time of contact of the monomer with catalyst will vary depending on the other reaction conditions, the mononomer or monomers being polymerized, the particular catalyst being used, the degree of polymerization desired, etc. Generally, the time will vary from a few minutes to a number of hours; however, it can in some cases run to a number of days.

The polymer can be recovered from the total reaction mixture by a wide variety of procedures, chosen in accordance with the properties of the particular polymer, the presence or absence of solvent, and the like. It is generally quite desirable to remove as much catalyst from the polymer as possible and this is conveniently done by contacting the total reaction mixture or the polymer after separation of the solvent, with a hydrocarbon or halogenated hydrocarbon, with methanolic hydrochloric acid, with an aliphatic alcohol such as methanol, isobutanol, secondary butanol, or by various other procedures or combinations of these catalyst removing agents. If the polymer is insoluble in the solvent it can be separated therefrom by filtration, centrifuging or other suitable physical separation procedures. If the polymerization is carried out in the presence of a solvent, as will normally be the case, and the polymer is insoluble in the solvent most of the catalyst will be removed from the polymer by filtration to remove the solvent with catalyst dissolved therein, then washing the polymer one or more times with the polymerization solvent and/or other medium is a particularly desirable method of reducing further the catalyst level in the polymer. After washing the polymer with the polymerization medium, it may be desirable to kill the activity of any catalyst remaining in the polymer by treating the polymer with an aliphatic alcohol such as methanol. If the polymer is soluble in the solvent, it is adventageously precipitated by adding to the solution a non-solvent usually being an organic liquid miscible with the solvent but in which the polymer to be recovered is not readily soluble. Of course, any solvent present can also be separated from the polymer by evaporation of the solvent, care being taken to avoid subjecting the polymer to a temperature so high as to cause deterioration of the polymer in such an operation. If a higher boiling solvent is used, it may be desirable to finish any washing of the polymer with a low boiling material such as one of the aliphatic alcohols or hexane, pentane, etc., which aids removal of the higher boiling materials and permits the maximum removal of extraneous materials during the final polymer drying step. Such a drying step is desirably effected in a vacuum at moderate temperatures, preferably well below 100° C.

The structure of the non-transition metal compound made in the process of the present invention is the same as the structure for the same metal in the above-mentioned copending application, but the structure of the transition metal compounds made in the process of the present invention is not known. The non-transition metal compounds are of the formula $$X_nM-\underset{\underset{H}{|}}{\overset{H}{|}}{C}-MX_n$$

and the mono- and di-hydrohalides thereof wherein M is boron or a Group II, Group III–A or Group IV–A metal, X is a halogen element and $n$ is one less than the valence of M; however, compounds of the formula $$X_nM-\underset{\underset{R^2}{|}}{\overset{R^1}{|}}{C}-MX_n$$

where X, $n$ and M are as defined above, $R^1$ and $R^2$ taken singly are hydrogen atoms or hydrocarbon groups preferably having not more than 8 carbon atoms and preferably being aliphatic and $R^1$ and $R^2$ taken together with the carbon atom to which they are attached form a vinylene group in which one or both of the hydrogen atoms can alternatively be hydrocarbon groups preferably not having more than 8 carbon atoms and preferably being aliphatic are also catalyst components and can also be made by the electrolytic process provided the dihalide from which they are made does not readily dehydrohalogenate or alkylate.

In these compounds, M is Be, Mg, Ca, Sr, Ba, Ra, Zn, Cd, Hg, B, Al, Ga, In, Tl, Si, Ge, Sn or PB, X can be chlorine, bromine, iodine or fluorine but is preferably a chlorine atom or an iodine atom. The X's can be the same or different halogen atoms, e.g., mixtures of chlorine and fluorine or chlorine and iodine atoms in the same compound. The hydrohalides, i.e., the mono- or di-hydrohalides, of chlorine, bromine, iodine or fluorine of the M compounds described above are also usable, but the hydrochlorides or hydroiodides are preferred.

Illustrative of these $$X_nM-\underset{\underset{R^2}{|}}{\overset{R^1}{|}}{C}-MX_n$$

compounds are the following:

Cl₂AlCH₂AlCl₂, Br₂AlCH₂AlBr₂, I₂AlCH₂AlI₂
F₂AlCH₂AlF₂, Cl₂AlCH₂AlI₂

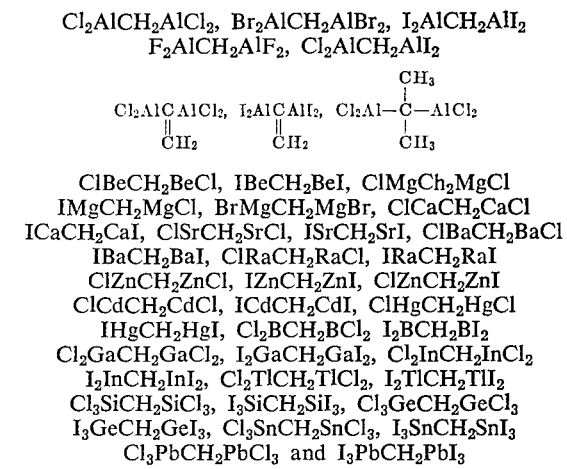

ClBeCH₂BeCl, IBeCH₂BeI, ClMgCh₂MgCl
IMgCH₂MgCl, BrMgCH₂MgBr, ClCaCH₂CaCl
ICaCH₂CaI, ClSrCH₂SrCl, ISrCH₂SrI, ClBaCH₂BaCl
IBaCH₂BaI, ClRaCH₂RaCl, IRaCH₂RaI
ClZnCH₂ZnCl, IZnCH₂ZnI, ClZnCH₂ZnI
ClCdCH₂CdCl, ICdCH₂CdI, ClHgCH₂HgCl
IHgCH₂HgI, Cl₂BCH₂BCl₂ I₂BCH₂BI₂
Cl₂GaCH₂GaCl₂, I₂GaCH₂GaI₂, Cl₂InCH₂InCl₂
I₂InCH₂InI₂, Cl₂TlCH₂TlCl₂, I₂TlCH₂TlI₂
Cl₃SiCH₂SiCl₃, I₃SiCH₂SiI₃, Cl₃GeCH₂GeCl₃
I₃GeCH₂GeI₃, Cl₃SnCH₂SnCl₃, I₃SnCH₂SnI₃
Cl₃PbCH₂PbCl₃ and I₃PbCH₂PbI₃

The compounds $$Cl_nM-\underset{\underset{R^2}{|}}{\overset{R^1}{|}}{C}-MCl_n$$

are the most preferred of our catalyst components, especially Cl$_n$M—CH₂—MCl$_n$, and they are all new compounds—$n$, M, $R^1$ and $R^2$ are as defined above. Thus, if Al is the non-transition metal and CH₂Cl₂ is the methylene dihalide, the product is Cl₂AlCH₂AlCl₂ in the process of the present invention.

For conventional catalysts such as the Ziegler catalysts, treatment of their polymer products to remove catalyst residues is an expensive and necessary operation. The catalysts of the present invention have extremely high catalyst activity giving very high yields of polymer product per gram of catalyst, and also these catalysts have a high degree of solubility normally being soluble in the methylene dihalide in which they are made. These catalysts of the invention, in general, are more soluble than the Ziegler catalysts which are usually used as suspensions rather than solutions for polymerization, and at least the chlorides will usually be soluble in the methylene dichloride in which they are made in sufficient concentrations for polymerization, although obviously they can be used as suspensions as are the Ziegler catalysts. As a result, small amounts of catalyst can be used and most of the catalyst is removed from the polymer in the liquid polymerization solvent when the solvent is separated from the polymer product. As a practical matter, the catalyst residues in the polymer products are insignificant and no further treatment of the polymer product to remove catalyst residues is usually necessary. Thus, our polymer product can normally be recovered inexpensively by any one of a number of alternative methods, for example: (1) the polymer slurry from the polymerization reactor can go directly to a drier where the liquid polymerization medium such as hexane or methylene dichloride is evaporated off and the dried polymer finished product is produced, (2) most of the liquid can be removed from the polymer slurry in a centrifuge or filter and then the balance can be removed in a drier, or (3) most of the liquid can be removed in the centrifuge or filter, the polymer cake can be washed on the centrifuge or filter to further reduce catalyst levels in the polymer and then the polymer cake can be dried. Normally, when using a Ziegler catalyst, such as $Al(C_2H_5)_3+TiCl_4$, the polymer would have to be subjected to a multistate washing technique such as described in U.S. 3,074,921 to reduce catalyst levels to an acceptable level.

The invention will be more clearly understood from the following detailed description of specific examples thereof read in conjunction with the accompanying drawing wherein a continuous process for producing solid ethylene polymer is described. Pumps and valves have not been shown in the attached drawing since it is intended to be a flow diagram and startup of the process is not described but rather operation after the process has been lined out and is operating continuously.

Vessel 1 is an electrolysis cell, 2 is an anode made of an alloy of aluminum and vanadium having about 2.5% vanadium therein, 3 is an aluminum cathode and stirrer 11 is provided for agitation. Line 21 is for the purpose of introducing nitrogen to blanket the reaction in the electrolysis cell and line 22 is for the purpose of venting nitrogen. Instead of anode 2, two separate anodes can be used, one of aluminum and the other of vanadium with the ratio of the surface area on the vanadium anode to the aluminum anode being such as to give about the same catalyst composition as the 2.5% vanadium alloy. Into the electrolysis cell through line 20 is introduced a preelectrolysis solution consisting of methylene dichloride, aluminum trichloride and an equimolar amount of water based on the aluminum trichloride plus a small amount of cyclohexene to promote conductivity in the cell. The direct current flowing through the cell is adjusted to a sufficiently high level to avoid the formation of any substantial amounts of strictly chemical catalyst.

Catalyst is charged via line 23 to polymerization vessel 4 which is agitated by stirrer 5. Through line 24 ethylene, containing about 20 volume percent hydrogen, is continuously charged to vessel 4 and through line 25 makeup hexane is charged to vessel 4. From the top of the polymerization vessel through line 26 ethylene which has not been polymerized plus some vaporized dichloromethane and hexane flow to condenser 6. From condenser 6 gaseous ethylene goes through line 27 to compresor 7 which delivers the ethylene back to polymerization vessel 4 through line 29. Through line 28 condensed hexane and methylene dichloride from condenser 6 go to enclosed basket centrifuge 8 for the purpose of washing centrifuged polyethylene cake. Alternatively, if it is decided not necessary or desirable to wash the polyethylene cake in the centrifuge, the condensed hexane and methylene dichloride can be returned directly to the polymerization vessel.

From the bottom of polymerization vessel 4 a slurry of polyethylene in hexane and methylene dichloride is taken through line 30 and introduced to centrifuge 8. From centrifuge 8, via line 31, hexane and methylene dichloride containing catalyst which has been separated from the polyethylene is returned to the polymerization vessel and, under such conditions, only makeup catalyst need be added to the polymerization vessel via line 23. Alternatively, if it is not desired to re-use the catalyst recovered from the centrifuge, the hexane and methylene dichloride containing the catalyst can be distilled to remove the catalyst, the solvent condensed and returned to the polymerization vessel.

The polyethylene separated from the slurry in centrifuge is withdrawn from the centrifuge via line 32 and goes to dryer 9. In dryer 9 the hexane and methylene dichloride remaining with the polyethylene are evaporated and taken via line 34 to condenser 10. The condensed methylene dichloride and hexane from condenser 10 are returned to the polymerization vessel via line 35. From dryer 9 the dried polyethylene product is removed via line 33. An alternative method of operating is to bypass centrifuge 8 with the slurry in line 30 and charge the slurry directly to dryer 9. In these continuous processes, methylene dichloride introduced into the system with fresh catalyst would build up over a period of time and it might be desired eventually to purify the solvent in the system by distillation to reduce the methylene dichloride level; however, methylene dichloride is as good a polymerization medium as hexane.

EXAMPLE 1

This example describes the preparation of a catalyst by electrolysis using aluminum and vanadium strips as anodes and aluminum as cathodes, and the polymerization of ethylene with this catalyst. The pre-electrolysis solution consisted of 400 ml. of methylene dichloride, 0.268 g. of aluminum trichloride and 18 µl. of water. All materials in the examples are carefully purified and are also carefully dried using drying materials and molecular sieves where appropriate, so impurities are minimized and water used, if any, is accurately known as to quantity. The aluminum anode was a hollow cylinder and the vanadium anode was connected electrically by clipping a small piece of vanadium to the inner wall of the aluminum anode cylinder. The cathodes were hollow Al cylinders, one located within the anode and one outside. The pre-electrolysis solution was charged to the electrolysis vessel and electrolysis was carried out for about 40 minutes, maintaining 0.5 amp current by voltage adjustment. One ml. of cyclohexene was charged to the electrolysis cell at the beginning of the electrolysis and an additional 0.5 ml. of cyclohexene was charged to the electrolysis cell at about 34 minutes from the start of the electrolysis to promote conductivity. Nitrogen-blanketing was used during the electrolysis. From the aluminum anode 0.3651 g. of aluminum was lost during the electrolysis and from the vanadium anode 0.0092 g. of vanadium was lost. This amounts to 13.52 milligram atoms of aluminum and 0.18 milligram atom of vanadium lost from the anodes. The vanadium anode area was approximately 2.38 square inches and the aluminum anode area was approximately 13.63 square inches. The molar ratio of Al/V in the solution was about 73:1.

Ethylene was then polymerized using the electrolysis solution catalyst described in the previous paragraph. This catalyst hand an Al/V ratio of 73 and was soluble in the methylene dichloride. To the polymerization vessel was charged 27.5 ml. of the electrolysis solution of the previous paragraph having 0.5 millimole of bis-(dichloroaluminum)methane and $14 \times 10^{-6}$ g. atoms of vanadium therein. One liter of hexane was also added to the polymerization vessel. The polymerization vessel was a stirred pressure vessel. After the electrolysis solution and hexane had been charged to the polymerization vessel the mixture was stirred for a short time, then the reaction was pressured to 42 p.s.i.g. with ethylene, to 57 p.s.i.g. with hydrogen and finally to 76 p.s.i.g. with ethylene. This gives approximately 20 mole percent hydrogen in the gas. The ethylene feed valve was left open to maintain the ethylene pressure and the stirrer turned on. The polymerization was run for 43 minutes. The reactor was then vented and flushed with nitrogen. The reactor was partially dumped through the bottom drain, the reactor was opened and the remaining polymer recovered. The polymer was in a coarse granular form. The polymer was washed with methanol, dried overnight in a vacuum oven and treated with 50 ml. of Ionol solution (1 milligram of Ionol/ml. methanol). Ionol is 2,6-di-tert-butyl-4-methylphenol. Yield of polymer was 38.6 g. of solid polyethylene having an $I_2$ of 0.0025 and an $I_{10}$ of 0.0517. $I_2$ is the melt index of the polymer product using a 2 kilogram weight and $I_{10}$ is the melt index of the polymer product using a 10 kilogram weight in the standard melt index test.

EXAMPLE 2

This example describes the making of an electrolytic catalyst from a vanadium and aluminum alloy, analysis of this catalyst and the polymerization of ethylene using this catalyst. The alloy was primarily aluminum with allegedly 2.5% vanadium therein. Actual analysis showed the vanadium percentage to be 1.83%.

The electrolysis cell was charged with 400 ml. of methylene dichlorode, 0.268 g. of aluminum trichloride and 18 $\mu$l. of water. The anode in the electrolysis cell was the previously discussed 1.83% of vanadium in aluminum alloy. Also, as in Example 1 and in fact in all the examples, cyclohexene was added to promote conductivity. Electrolysis was carried out in a similar manner to Example 1. Nitrogen-blanketing of the electrolysis cell was used during the electrolysis. Material lost from the anode was 0.4644 g. during the electrolysis.

The polymerization of ethylene using the catalyst described in the previous paragraph was carried out as follows: To the polymerization vessel was charged 1 liter of hexene and 90 ml. of the electrolysis solution (having about 2 millimoles of cocatalyst therein) described in the previous paragraph. The polymerization vessel was pressured to 70 p.s.i.g. with ethylene and the polymerization was rapid and exothermic. The polymerization was terminated after 10 minutes. The reactor was opened and was found to be a solid mass of polyethylene around the top of the reactor. The polyethylene was placed in methanol and heated to reflux. The large pieces of polyethylene were broken up in a Waring Blendor and the polyethylene isolated by filtering. The polyethylene was washed on the filter and methanol and dried in a vacuum oven. Yield of solid polyethylene was 36.0 g. Based on an analysis for vanadium in the electrolysis solution the yield of polyethylene is 40,464 g. of polyethylene per gram of vanadium.

EXAMPLE 3

This experiment is a repeat of Example 1 after very carefully cleaning the reactor. To the reactor was charged 27.5 ml. of the electrolysis solution having 0.5 millimole of bis-(di-chloroaluminum)methane and $14 \times 10^{-6}$ g. atoms of vanadium as made in Example 1 and 1 liter of hexane. The contents of the reactor were stirred for a short time as in Example 1 and the reactor was pressured to 42 p.s.i.g. with ethylene, then to 57 p.s.i.g. with hydrogen and finally to 76 p.s.i.g. with ethylene. This gave approximately 20 mole percent hydrogen in the gas The ethylene valve was left open to maintain the 76 p.s.i.g. Polymerization was run for 30 minutes. The reactor was then vented and flushed with nitrogen. The reactor was dumped through the bottom drain, flushed out with an additional 500 ml. of hexane and the reactor opened. The reactor was quite clean with only a small amount of polymer present above the liquid level. The polymer was washed with methanol, treated with 50 ml. of Ionol solution and the polymer was dried overnight in a vacuum oven. Yield of the polymer was 82.7 g. This is a yield of 115,800 g. of solid polyethylene/g. vanadium. The polymer had an $I_2$ of 0.18 and $I_{10}$ of 2.7 giving an $I_{10}/I_2$ of 15.0.

EXAMPLE 4

This is another example of the polymerization of ethylene using an electrolysis catalyst formed using aluminum and vanadium anodes and a vanadium concentration in solution during polymerization of about 5 micromoles per liter. To the polymerization vessel was charged 15 ml. of electrolysis solution prepared as described in Example 1, containing about 0.25 millimole of bis-(dichloroaluminum)methane and 7 microgram atoms of vanadium in 1 liter of hexane. The stirrer in the reactor was turned off after mixing the catalyst and hexane, then the reactor was pressured with ethylene to 42 p.s.i.g., with hydrogen to 57 p.s.i.g. and finally with ethylene to 76 p.s.i.g. The stirrer was turned on and the polymerization run for 30 minutes. After the initial charge, pure ethylene was fed to the reactor to maintain the pressure. The polyethylene would not come out of the bottom drain and the reactor was opened to recover the polymer. The polymer was washed with methanol, ground in a Waring Blendor in methanol, filtered, washed on the filter with methanol and sucked dry. The solid polyethylene was treated with 4 ml. of Ionol solution and dried overnight in a vacuum oven at 60° C. Yield of polymer was 14.2 grams.

EXAMPLE 5

An electrolysis was carried out wherein an aluminum/manganese alloy anode was used having about 4.5% manganese. To the electrolysis cell was charged 400 ml. of methylene dichloride, 0.268 g. of aluminum trichloride and 18 $\mu$l. of water. The electrolysis was carried out in the usual fashion, maintaining a current of about 0.5 amp in the electrolysis cell. Loss of aluminum and manganese from the anode was 0.1973 gram.

An analysis of the electrolysis solution described in the previous paragraph was carried out and also of the aluminum/manganese alloy. Analysis showed the alloy to contain 4.3% manganese. The analysis of the electrolysis solution showed it to contain 0.712 milligram of aluminum per milliliter of electrolysis solution and 0.028 milligram of manganese per milliliter of solution.

A polymerization was carried out with this aluminum/manganese electrolysis solution polymerizing ethylene. To the polymerization vessel was added 90 ml. of electrolysis solution and 1 liter of hexane. The stirrer was turned on briefly to mix the hexane and electrolysis solution, then the polymerization vessel was pressurized to 42 p.s.i.g. with ethylene, to 57 p.s.i.g. with hydrogen and finally to 76 p.s.i.g. with ethylene. Feed to the reactor was maintained with pure ethylene to maintain the pressure. The polymerization was run for 2 hours. The reaction mixture was recovered by opening the reactor and the mixture was quenched with methanol, ground up in a Waring Blendor in methanol, filtered, washed on the filter with methanol and sucked dry on the filter. The polyethylene was treated with 15 ml. of Ionol solution and dried overnight in a vacuum oven at 60° C. Yield was 92.7 g. of solid polyethylene. This represents a yield of 36,320 grams of polyethylene per gram of manganese in catalyst.

EXAMPLE 6

This example describes an electrolysis and a polymerization wherein aluminum and vanadium anodes were used in the electrolysis. To the electrolysis cell was added 400 ml. of the methylene dichloride, 0.268 g. of aluminum trichloride and 18 $\mu$l. of water. The electrolysis was carried out in the usual fashion and loss of aluminum from the anode was 0.1882 and loss of vanadium was 0.0044 g. to give a concentration of bis-(dichloroaluminum) methane of 1 millimole in 102 ml. of solution and a concentration of vanadium of 1 micromole in 4 ml. of solution.

The polymerization run was made at about a 5 microgram atom vanadium per liter of solution level. To the polymerization vessel was charged 20 ml. of electrolysis solution containing about 0.2 millimole of bis-(dichloroaluminum)methane and 5 microgram atoms of vanadium and also charged was 1 liter of hexane. The stirrer was turned on briefly to mix the reactor contents, then the reactor was pressured to 42 p.s.i.g. with ethylene, to 57 p.s.i.g. with hydrogen and to 76 p.s.i.g. with ethylene. The stirrer was turned on again and the polymerization was run for ½ hour. Then, the reactor was opened, the polyethylene was removed from the reactor, was washed with methanol, the polyethylene was ground up in a Waring Blendor with methanol, was filtered, washed on the filter with methanol and sucked dry. To the solid polyethylene on the filter was added 8 ml. of Ionol solution and the polymer was dried overnight in a vacuum oven at 60° C. Yield of solid polyethylene was 36.5 g.

EXAMPLE 7

This is another electrolysis using aluminum and vanadium anodes. This electrolysis was run in the usual manner with the same amounts of solutions being added to the electrolysis cell as in the previous example. During the electrolysis, loss of aluminum from the anode was 0.2595 gram and loss of vanadium from the vanadium anode was 0.0115 gram.

The polymerization was run with the electrolysis solution described in the previous paragraph having a mole ratio of aluminum to vanadium of 43. To the polymerization vessel was charged 20 ml. of electrolysis solution containing 0.26 millimole of bis-(dichloroaluminum)-methane and $12 \times 10^{-6}$ gram atoms of vanadium. Also, 1 liter of hexane was added to the polymerization vessel. The reactor was charged to 42 p.s.i.g. with ethylene, to 57 p.s.i.g. with hydrogen and to 76 p.s.i.g. with ethylene. The ethylene valve was left on and the stirrer turned on. After 26 minutes of run time the packing nut on the reactor came loose and the reactor pressure was lost so the run was terminated at this point and the reactor opened after cooling. The polymerization mixture was quenched with methanol, filtered, washed with methanol and ground up in a Waring Blendor in methanol. The polymer was isolated by filtering under vacuum and was washed on the filter with methanol. The polymer was sucked dry, treated with 25 ml. of Ionol solution and dried overnight in a vacuum oven at 60° C. Yield of solid polyethylene was 79.7 grams.

EXAMPLE 8

An electrolysis was carried out wherein aluminum and manganese anodes were used. The usual amounts and proportions of pre-electrolysis solution were charged to the electrolysis cell. The electrolysis was carried out in the usual manner and loss of aluminum from the aluminum anode was 0.2035 g. and loss of manganese from the manganese anode was 0.0171 g.

The polymerization of ethylene was carried out using the electrolysis solution described in the previous paragraph which has an aluminum/manganese molar ratio of 24. About 47 ml. of electrolysis solution was charged to the polymerization reactor containing about 0.5 millimole of bis-(dichloroaluminum)methane and $4.15 \times 10^{-5}$ gram atoms of manganese. Also charged to the polymerization reactor was 1 liter of hexane. The reactor was charged to 42 p.s.i.g. with ethylene, to 56 p.s.i.g. with hydrogen and to 76 p.s.i.g. with ethylene. The ethylene line was left open to the reactor and the stirrer turned on. Polymerization was run for 40 minutes without significant temperature rise or ethylene uptake. At this point the reactor was vented to 38 p.s.i.g. to reduce the hydrogen concentration by approximately half. The reactor was re-pressured to 76 p.s.i.g. with pure ethylene and the polymerization was run for about 30 minutes during which time a slight increase in temperature and ethylene uptake was noted. The reactor was heated to 75° C. and run at 70° C. + or −5 degrees for 1 hour and 20 minutes. The reactor was cooled, vented and opened and the polymer re-covered in the usual fashion. Yield of polymer was 19.5 g. of solid polyethylene.

EXAMPLE 9

This example describes separately preparing electrolytically bis-(dichloroaluminum)methane and a vanadium specie which are combined to form a catalyst for the polymerization of ethylene. In the preparation of bis-(dichloroaluminum)methane, the pre-electrolysis solution consisting of 400 ml. of methylene dischloride, 0.268 g. of aluminum trichloride and 18 microliters of water are added to the electrolysis cell, the anode is aluminum and the electrolysis is carried out in the usual manner. During the electrolysis, 1.3271 g. of aluminum is lost from the anode which represents 19.15 milligram atoms of aluminum.

In the preparation of the vanadium specie, 400 ml. of methylene dichloride, 0.268 g. of aluminum trichloride and 18 microliters of water are charged to the electrolysis cell. The anode is vanadium and the electrolysis is carried out in the usual fashion. Cyclohexene was used, as in Example 1, to promote conductivity; however, ethylene blanketing could be used instead because the other catalyst component is not present and the ethylene will not be polymerized. During the electrolysis, 0.0260 g. of vanadium is lost from the anode which represents 0.510 milligram atom of vanadium.

The polymerization reactor was charged with 1 l. of hexane and 15 ml. of a mixed solution of electrolytic bis-(dichloroaluminum)methane and electrolytic vanadium solutions. In this 15 ml. of the mixed solutions are 0.011 milligram atom of vanadium and 0.534 millimole of bis-(dichloroaluminum)methane. The reactor was pressured to 41 p.s.i.g. with ethylene, to 56 p.s.i.g. with hydrogen and then to 74 p.s.i.g. with ethylene. The stirrer in the reactor was then turned on and ethylene feed maintained to the reactor. Polymerization time was 13 minutes after which time the ethylene was turned off, the reactor was cooled, vented, and allowed to stand overnight. The next day the polymer was ground up in a blender with 25 ml. of methanol, the methanol separated and the polymer placed in a vacuum oven overnight to dry. Yield of polymer was 67.9 g. representing 6,179 g. of polyethylene per milligram atom of vanadium. The transition metal catalyst residue left in the polymer product is of most concern. Even assuming all the vanadium remained in the polymer product in this experiment, which is not the case in view of the treatment of the polymer with methanol, the vanadium residue in the polymer would be less than 8 parts per million, which is a sufficiently low level to be acceptable for most, if not all, commercial purposes.

Although the invention has been described in terms of specified embodiments which are set forth in considerable detail, it should be understood that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for making olefin polymerization catalysts comprising subjecting to electrolysis in an electrolyte employing a current density of at least 0.366 amp./dm.$^2$ a compound of the formula $CH_2X_2$ wherein X is a halogen atom, using an anode of an element selected from the group consisting of boron and Groups II, III–A and IV–A metals and an anode of a transition metal selected from groups consisting of Groups III–B, IV–B, V–B, VI–B, VII–B, VIII and I–B metals or an anode of an alloy of an above-named element and of an above-named transition metal.

2. A process of claim 1 wherein a non-reactive olefin is used in sufficient amount to promote the conductivity.

3. A process of claim 1 wherein inert gas blanketing of the electrolysis cell is used.

4. A process of claim 1 wherein rather than an alloy anode, separate anodes of non-transition element and transition metal are used, and the ratio of areas exposed to electrolysis on the anodes is adjusted to give the desired ratio of non-transition element to transition metal in the catalyst.

5. A process of claim 1 wherein a sufficient amount of water is added to promote conductivity.

6. A process of claim 1 wherein X is a chlorine atom.

7. A process of claim 1 wherein the electrolyte is $HOAlCl_2$, X is a chlorine atom, the non-transition metal is Al, the transition metal is V, inert gas blanketing of the electrolysis cell is used and a sufficient amount of cyclohexane is present to promote conductivity.

8. A process of claim 1 wherein the electrolyte is $HOAlCl_2$, X is a chlorine atom, the non-transition metal is Al, the transition metal is Mn, inert gas blanketing of the electrolysis cell is used and a sufficient amount of cyclohexene has been added to the electrolysis cell to promote conductivity.

9. A process for making a transition metal compound comprising subjecting to electrolysis in an electrolyte employing a current density of at least 0.366 amp./dm.$^2$ a compound of the formula $CH_2X_2$ wherein X is a halogen atom, using an anode of a transition metal selected from groups consisting of Groups III–B, IV–B, V–B, VI–B, VII–B, VIII and I–B metals.

10. A process of claim 9 wherein an olefin is used in sufficient amount to promote conductivity.

11. A process of claim 9 wherein inert gas blanketing of the electrolysis cell is used.

12. A process of claim 9 wherein X is a chlorine atom.

13. A process of claim 9 wherein the electrolyte is $HOAlCl_2$, X is a chlorine atom, the transition metal is V, inert gas blanketing of the electrolysis cell is used and a sufficient amount of cylohexene is present to promote conductivity.

14. A catalyst made by the process of claim 1.

References Cited
UNITED STATES PATENTS

| | | | |
|---|---|---|---|
| 3,197,392 | 7/1965 | Silversmith et al. | 204—59 |
| 3,236,755 | 2/1966 | Werner | 204—59 |
| 3,330,746 | 7/1967 | Inoue | 204—72X |

PATRICK P. GARVIN, Primary Examiner

U.S. Cl. X.R.

204—72; 252—429, 431; 260—94.9

PO-1050
(5/69)

UNITED STATES PATENT OFFICE
CERTIFICATE OF CORRECTION

Patent No. 3,546,083          Dated   December 8, 1970

Inventor(s)   Morris R. Ort and Edward H. Mottus

It is certified that error appears in the above-identified patent and that said Letters Patent are hereby corrected as shown below:

Column 1, line 21, for "meal" read --- metal ---.

Column 2, line 51, for "Tc." read --- Tc, ---.

Column 5, line 34, for "methalyl" read --- methallyl ---.

Column 8, line 45, for "ClMgCh$_2$MgCl" read --- ClMgCH$_2$MgCl ---

Column 11, line 3, for "reaction" read --- reactor ---.

Column 11, line 54, for "and" read --- with ---.

Column 11, line 52; Column 12, line 26; Column 12, line 60; Column 13, line 18; Column 13, line 46, for "Blendor" read --- blender ---.

Column 14, line 17, for "dischloride" read --- dichloride ---.

Claim 7, lines 4-5, for "cyclohexane" read --- cyclohexene ---.

Signed and sealed this 21st day of September 1971.

(SEAL)
Attest:

EDWARD M. FLETCHER, JR.
Attesting Officer

ROBERT GOTTSCHALK
Acting Commissioner of Pate